(12) United States Patent
Teranishi

(10) Patent No.: US 12,501,575 B2
(45) Date of Patent: Dec. 16, 2025

(54) OPERATION DEVICE

(71) Applicant: CANON KABUSHIKI KAISHA, Tokyo (JP)

(72) Inventor: Kei Teranishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 18/533,939

(22) Filed: Dec. 8, 2023

(65) Prior Publication Data

US 2024/0215195 A1 Jun. 27, 2024

(30) Foreign Application Priority Data

Dec. 22, 2022 (JP) .................................. 2022-205269

(51) Int. Cl.
*H05K 7/20* (2006.01)
*H04N 23/62* (2023.01)
*H04N 23/66* (2023.01)

(52) U.S. Cl.
CPC ......... *H05K 7/20145* (2013.01); *H04N 23/62* (2023.01); *H04N 23/66* (2023.01)

(58) Field of Classification Search
CPC ... H05K 7/20136–20154; H04N 23/62; H04N 23/66
See application file for complete search history.

(56) References Cited

U.S. PATENT DOCUMENTS

| | | | | | |
|---|---|---|---|---|---|
| 5,862,037 | A * | 1/1999 | Behl | ...................... | G06F 1/203 361/679.48 |
| 6,034,871 | A * | 3/2000 | Cheng | ..................... | G06F 1/203 165/104.34 |
| 6,104,607 | A * | 8/2000 | Behl | ...................... | G06F 1/203 415/213.1 |
| 7,480,140 | B2 * | 1/2009 | Hara | ................... | H05K 7/20145 361/709 |
| 7,948,754 | B2 * | 5/2011 | Huang | .................... | G06F 1/203 361/679.48 |
| 2006/0126289 | A1 * | 6/2006 | Takenoshita | ............ | G06F 1/203 361/679.48 |
| 2007/0291451 | A1 * | 12/2007 | Takenoshita | ............ | G06F 1/203 361/709 |

FOREIGN PATENT DOCUMENTS

JP 2002099351 A 4/2002
WO WO-2021247044 A1 * 12/2021 ........... B01D 46/521

* cited by examiner

*Primary Examiner* — Robert J Hoffberg
(74) *Attorney, Agent, or Firm* — Canon U.S.A., Inc. IP Division

(57) ABSTRACT

An operation device includes a housing, an inlet port, and an outlet port. The housing has an exposed portion and an embedded portion. The inlet port is formed in the housing and takes air into an inside of the housing from an outside of the housing. The outlet port is formed in the housing and exhausts air from the inside of the housing to the outside of the housing. The inlet port is arranged in one of the exposed portion and the embedded portion and the outlet port is arranged in the other of the exposed portion and the embedded portion. The operation device is configured such that, when the operation device is installed, the operation device is installed in a state in which a part of the housing is buried.

9 Claims, 13 Drawing Sheets

OPERATION DEVICE

BACKGROUND

Field

The present disclosure relates to an operation device that is installed in a state in which a part of a housing is buried.

Description of the Related Art

Conventionally, image capturing systems have been known that remotely control image capturing apparatuses, such as digital cameras and video cameras, using operation devices, and control various functions of the image capturing apparatuses, such as movement of field angles and focus of the image capturing apparatuses. Using such an image capturing system enables a user to change an image capturing condition to a desired setting even at a position away from an image capturing apparatus and to capture an image with a high degree of freedom.

This type of operation device is often installed in a console. As an installation form of an operation device, there are an installation form in which the operation device is located on a console and an installation form in which a part of a housing of the operation device is embedded in the console. According to Japanese Patent Application Laid-Open No. 2002-099351, a configuration is discussed in which a console has a concave opening portion for storing a controller.

SUMMARY

According to an aspect of the present disclosure, an operation device includes a housing having an exposed portion and an embedded portion, an inlet port formed in the housing and configured to take air into an inside of the housing from an outside of the housing, and an outlet port formed in the housing and configured to exhaust air from the inside of the housing to the outside of the housing, wherein the inlet port is arranged in one of the exposed portion and the embedded portion and the outlet port is arranged in the other of the exposed portion and the embedded portion, and wherein the operation device is configured such that, when the operation device is installed, the operation device is installed in a state in which a part of the housing is buried.

Further features of the disclosure will become apparent from the following description of exemplary embodiments with reference to the attached drawings.

DESCRIPTION OF THE EMBODIMENTS

Exemplary embodiments of the present disclosure will be described with reference to the attached drawings.

Figure 1:
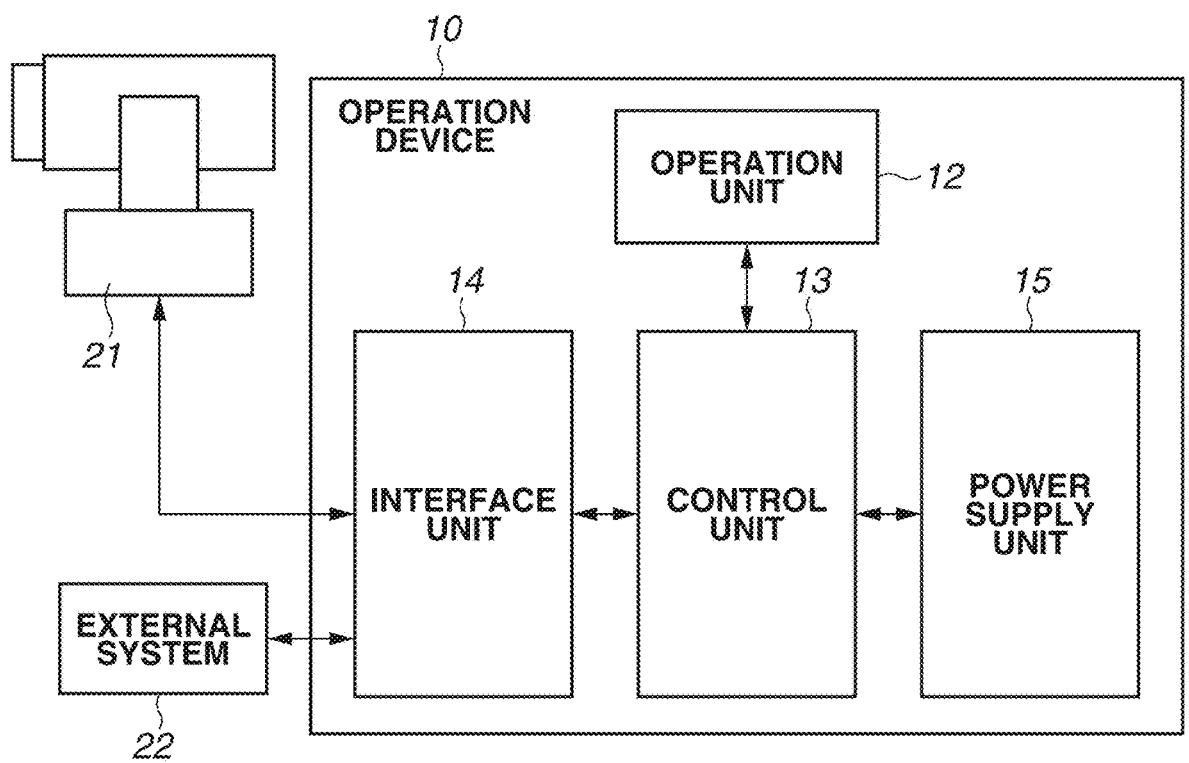
FIG. 1 is a block diagram illustrating a configuration example of an image capturing system including an operation device according to a first exemplary embodiment.

An image capturing system including an operation device 10 according to a first exemplary embodiment is to be described with reference to FIG. 1. FIG. 1 is a block diagram illustrating a configuration example of the image capturing system including the operation device 10.

The image capturing system includes a pan-tilt-zoom (PTZ) camera 21, the operation device 10, and an external system 22.

The PTZ camera 21 is an image capturing apparatus that includes a lens having zooming, focusing, and other functions and an image capturing unit that captures an object image through the lens. The PTZ camera 21 is configured to be able to perform turning operations such as panning and tilting.

The operation device 10 is used to remotely control the PTZ camera 21. The operation device 10 performs control of various parameters of the PTZ camera 21 such as zooming and video gain adjustment and various types of control related to an image capturing direction of the PTZ camera 21 such as panning and tilting. The operation device 10 includes an operation unit 12, a control unit 13, an interface unit 14, and a power supply unit 15, and each unit is connected via wiring and the like. The operation unit 12 includes various operation members such as a push button and a dial. The control unit 13 includes a central processing unit (CPU) as a control unit that controls each unit and a storage medium such as a memory. The interface unit 14 connects the operation device 10 to the PTZ camera 21 and the external system 22. The power supply unit 15 supplies power to each unit in the operation device 10.

The operation device 10 according to the first exemplary embodiment is to be described with reference to FIGS. 2 to 6.

Figure 2:
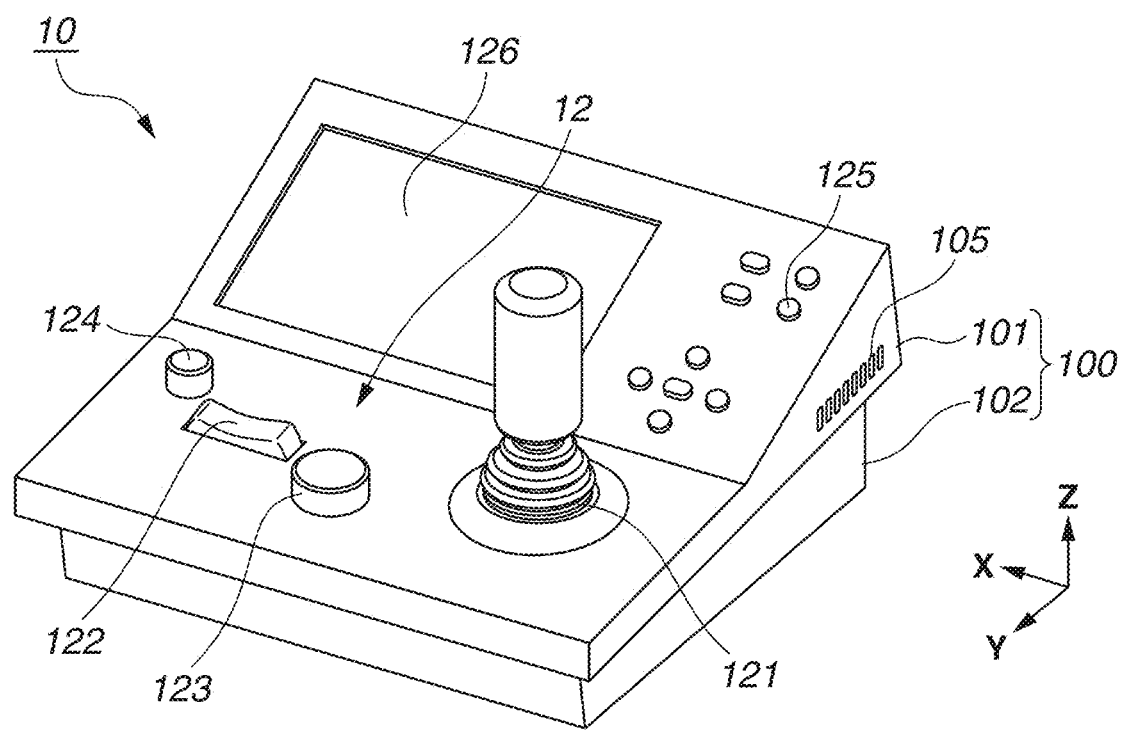
FIG. 2 is a front perspective view of the operation device according to the first exemplary embodiment.

FIG. 2 is a front perspective view of the operation device 10. According to the present exemplary embodiment, a width direction, a depth direction, and a height direction of the operation device 10, which are directions indicated by arrows in FIG. 2, are defined as a +X direction, a +Y direction, and a +Z direction, respectively, and opposite directions are defined as a −X direction, a −Y direction, and a −Z direction, respectively. A surface viewed from the +Y direction is regarded as a front surface, and a surface opposite to the front surface is regarded as a rear surface. Surfaces on a right side, a left side, an upper side, and a lower side viewed from the front surface are referred to as a right side surface, a left side surface, an upper surface, and a lower surface, respectively.

A housing 100 of the operation device 10 includes a first housing 101 and a second housing 102. The first housing 101 is a box-shaped housing that is opened at the lower side. The second housing 102 is a box-shaped housing that is opened at the upper side. The housing 100 is completed by assembling the first housing 101 to cover the second housing 102, and the first housing 101 and the second housing 102 form an upper portion and a lower portion of the housing 100, respectively.

The operation unit 12 is provided on an upper surface of the housing 100 (an upper surface of the first housing 101). The operation unit 12 includes a joystick 121 that can be operated in multiple directions for panning and tilting the PTZ camera 21, a zoom lever 122, a focus dial 123, an iris dial 124, and a button 125 to which various functions are assigned. A display unit 126 is provided on the upper surface of the housing 100. The upper surface of the housing 100 is formed with two inclined surfaces, and these two inclined surfaces are collectively referred to as an operation surface.

As described above, the housing 100 has the upper surface serving as the operation surface and four surfaces (the front surface, the right and left side surfaces, and the rear surface) connected to the operation surface.

The operation device 10 configured as described above is installed such that a part of the housing 100 is buried in a console 30 as described in detail below.

Figure 3:
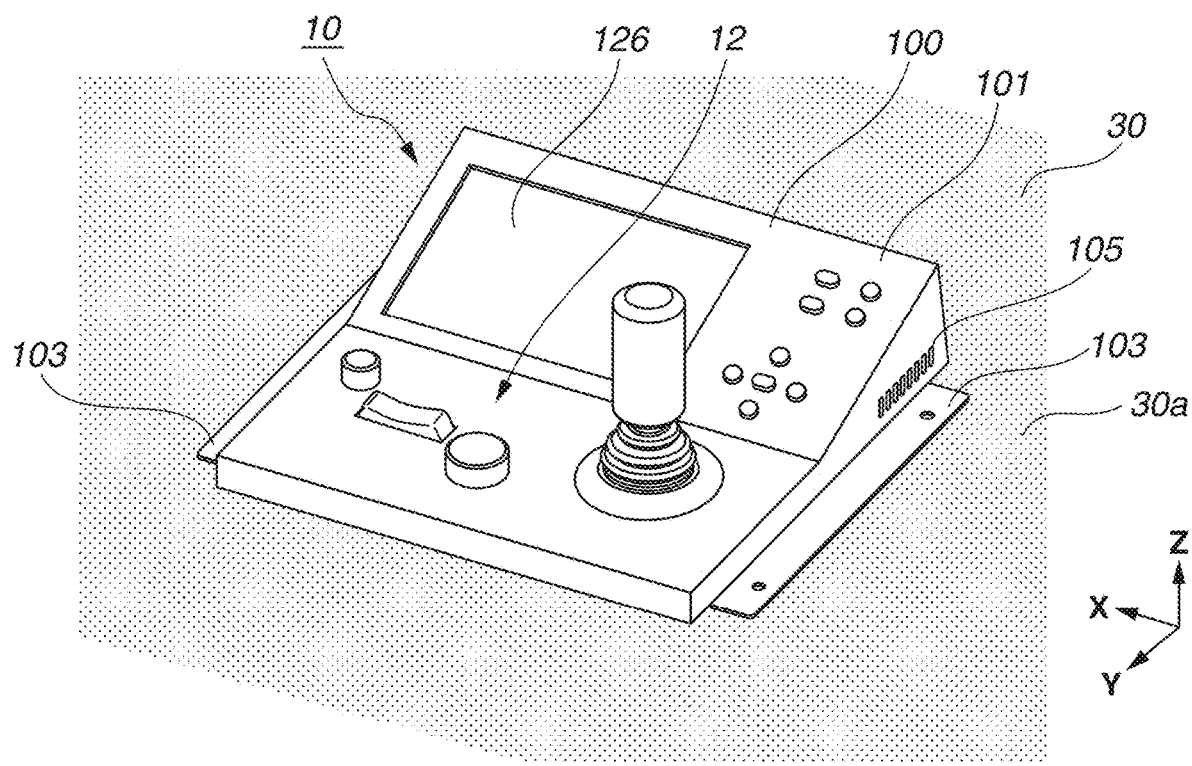
FIG. 3 is a front perspective view of the operation device according to the first exemplary embodiment, which is installed in a console.
Figure 4:
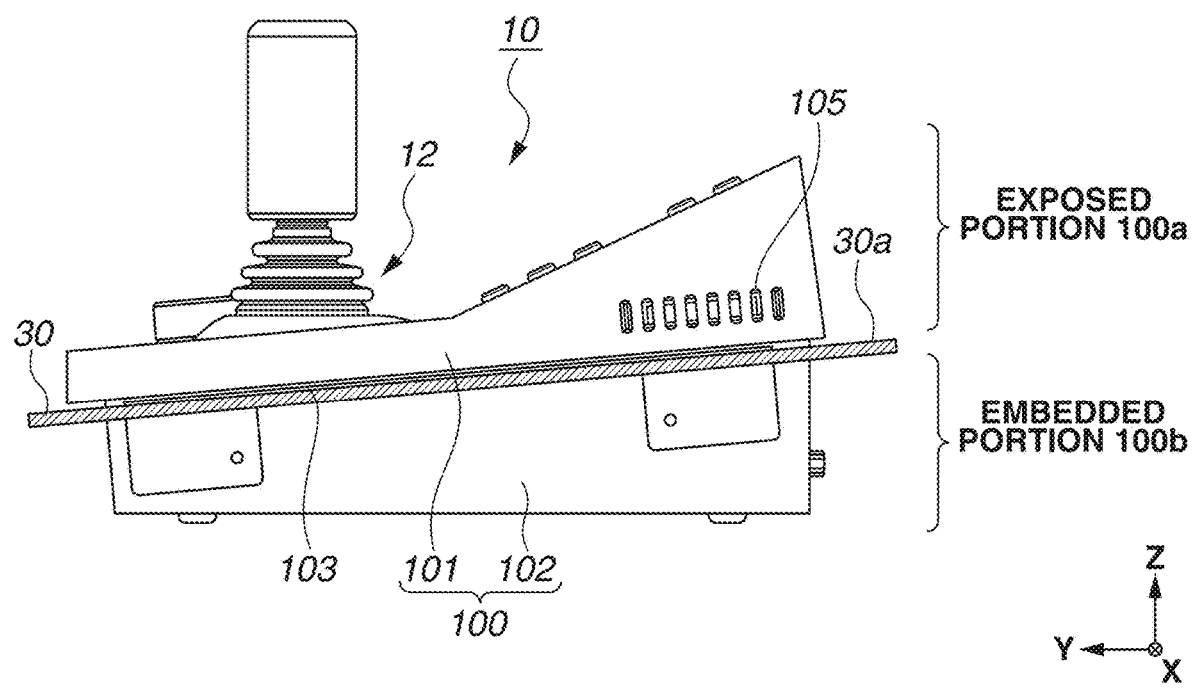
FIG. 4 is a side view of the operation device according to the first exemplary embodiment, which is installed in the console.

FIG. 3 is a front perspective view of the operation device 10 installed in the console 30. FIG. 4 is a right side view of the operation device 10 installed in the console 30. In FIGS. 3 and 4, only a console upper surface 30a of the console 30 is illustrated.

The console 30 has a space in which the lower portion of the housing 100 of the operation device 10 is embedded, and the console upper surface 30a has an opening (not illustrated in FIGS. 3 and 4) into which the lower portion of the housing 100 can be inserted.

Plate-shaped mounting units 103 protruding in the +X direction and the −X direction are provided on the right side surface and the left side surface of the housing 100. In a case where the lower portion of the housing 100 is inserted into the opening of the console upper surface 30a, the mounting units 103 are placed on the console upper surface 30a, and the operation device 10 can be fixed by fastening the mounting units 103 to the console upper surface 30a with bolts not illustrated. Accordingly, the part of the housing 100 located in the +Z direction from the mounting units 103 protrudes and is exposed above the console upper surface 30a. The part of the housing 100 is installed to be buried in the console 30 in this way, so that the operation surface can be brought closer to the console upper surface 30a, an overall irregularity of the console upper surface 30a can be reduced, and operability and comfortableness can be improved. As illustrated in FIG. 4, the housing 100 includes a portion located in the +Z direction with respect to the console upper surface 30a, which is referred to as an exposed portion 100a, and a portion located in the −Z direction with respect to the console upper surface 30a, which is referred to as an embedded portion 100b. The mounting units 103 are omitted from drawings other than FIGS. 3 and 4.

Figure 5:
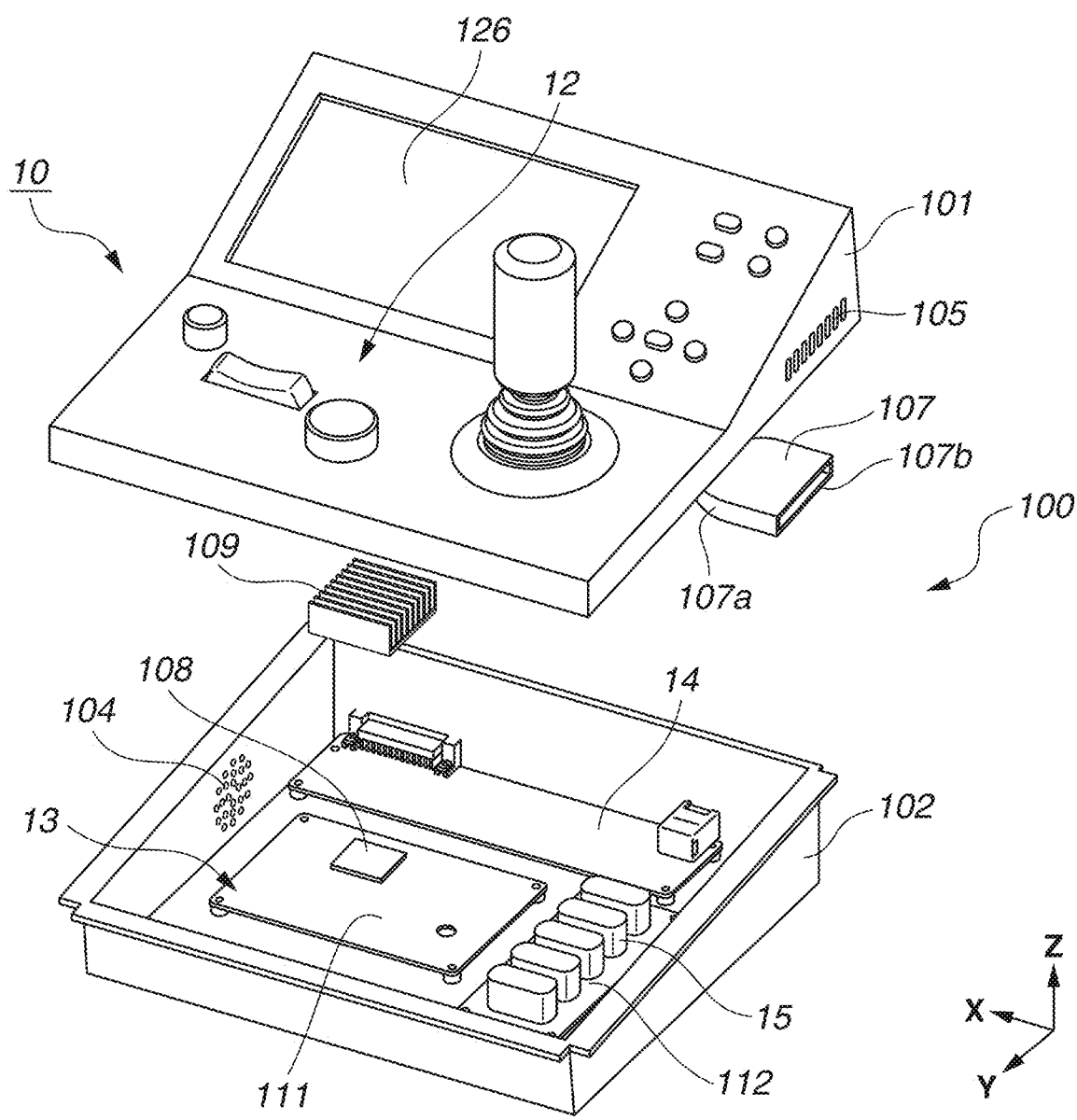
FIG. 5 is an exploded perspective view of the operation device according to the first exemplary embodiment.

An internal configuration of the operation device 10 is to be described with reference to FIG. 5. FIG. 5 is an exploded perspective view of the operation device 10.

The control unit 13, the interface unit 14, and the power supply unit 15 are installed inside the housing 100, and each unit is arranged parallel to the lower surface of the housing 100. The control unit 13 and the power supply unit 15 are arranged side by side in the X direction, with the control unit 13 on the left side (the +X direction side) and the power supply unit 15 on the right side (the −X direction side). The interface unit 14 and the power supply unit 15 are connected to the control unit 13 by wiring not illustrated.

The control unit 13 includes a substrate 111, which is a plate-shaped portion, and a heat generating element 108 is mounted on the substrate 111. The heat generating element 108 is, for example, a CPU and a field programmable gate array (FPGA) and performs parameter control and video analysis of the PTZ camera 21, control of the display unit 126, and the like. In the control unit 13, the heat generating element 108 particularly generates heat in driving and becomes a heat source, and the heat generating element 108 needs to be cooled. Regarding the heat generating element 108, the substrate 111 is attached to the lower surface of the housing 100. The heat generating element 108 configured as described above is arranged in the embedded portion 100b and is located away from the operation unit 12. A heatsink 109 that is arranged on the heat generating element 108 to diffuse and radiate the heat from the heat generating element 108 is provided on the substrate 111.

The power supply unit 15 generates heat in driving and becomes a heat source, and the power supply unit 15 needs to be cooled. The power supply unit 15 includes a substrate 112, which is a plate-shaped portion, and the substrate 112 is attached to the lower surface of the housing 100. The power supply unit 15 configured as described above is arranged in the embedded portion 100b.

As described above, components that generate heat and become heat sources are installed inside the operation device 10. In an installation form in which the part of the housing 100 of the operation device 10 is embedded in the console 30, air inside the operation device 10 is heated by the heat sources. Thus, heat accumulates in the space inside the operation device 10 and makes it difficult to cool down the heat sources inside the operation device 10.

An inlet port 104 for taking in outside air is formed in a center portion of the left side surface of the second housing 102. In other words, the inlet port 104 is arranged in the embedded portion 100b of the housing 100. The inlet port 104 is arranged on the +X direction side with respect to positions of the heat generating element 108 and the heatsink 109 so that air flowing from the inlet port 104 and advancing in the −X direction flows along fins of the heatsink 109.

An outlet port 105 for exhausting the air inside the housing 100 is formed at a back (the −Y direction) of the right side surface of the first housing 101. In other words, the outlet port 105 is arranged in the exposed portion 100a of the housing 100.

In this way, the inlet port 104 and the outlet port 105 are arranged on different surfaces of the housing 100. The inlet port 104 and the outlet port 105 are separated, so that air flow can be generated in a wide area inside the housing 100, and cooling efficiency of the heat sources can be increased.

A fan is installed inside the housing 100 to generate air flow from the inlet port 104 to the outlet port 105. According to the present exemplary embodiment, an exhaust fan 107 including a centrifugal fan is arranged near the outlet port 105. The exhaust fan 107 is installed inside the first housing 101 and arranged such that a suction port 107a faces in the +Y direction and a discharge port 107b faces the outlet port 105. Although it is described that the suction port 107a faces in the +Y direction, the suction port 107a may also be arranged with an angle so that the suction port 107a faces slightly in the +X direction.

Although it is described that the centrifugal fan is used as the exhaust fan 107, other types of fans such as an axial flow fan may also be used. Generally, a centrifugal fan has a higher wind speed than an axial flow fan, can increase heat transfer coefficient, and can improve cooling efficiency of a heat source. Although it is described that the heatsink 109 is used, a heat radiation member other than the heatsink may be used, and the effects of the present disclosure can be acquired even in a case where the heat radiation member is not used.

Figure 6:
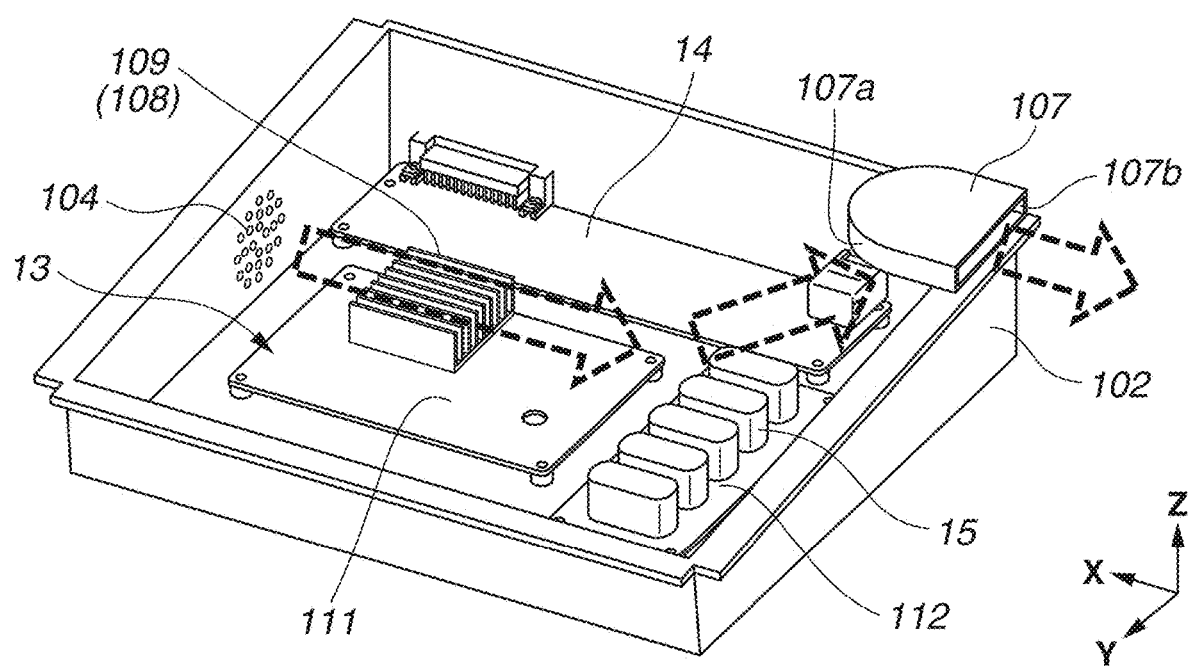
FIG. 6 illustrates air flow in the operation device according to the first exemplary embodiment.

Air flow inside the housing 100 of the operation device 10 according to the first exemplary embodiment is to be described with reference to FIG. 6. FIG. 6 illustrates the air flow in the operation device 10, and dotted arrows visualize the air flow inside the housing 100.

Air in the space inside the console 30 flows into the housing 100, which is under negative pressure due to the exhaust fan 107, from the inlet port 104. The air flowing in from the inlet port 104 flows in a direction from the left side surface side of the housing 100 toward a right side surface, and a part of the air flows along the fins of the heatsink 109 to cool the heat generating element 108. A flow of the air sucked from the suction port 107a of the exhaust fan 107 is generated, so that a part of the air hits and cools the power supply unit 15. The air inside the housing 100 is sucked through the suction port 107a of the exhaust fan 107, is discharged from the discharge port 107b, passes through the outlet port 105, and is exhausted to the outside of the housing 100 and the console 30.

Effects due to the configuration of the operation device 10 according to the first exemplary embodiment are to be described.

One of the effects is that the inlet port 104 and the outlet port 105 are arranged in the embedded portion 100b and the exposed portion 100a of the housing 100, respectively, and thus the heat sources can be efficiently cooled.

According to the present exemplary embodiment, air that is sucked from the embedded portion 100b of the housing 100 and warmed by cooling the heat sources inside the housing 100 is exhausted from the exposed portion 100a to the outside of the console 30, so that the heat sources can be efficiently cooled. For example, in a case where the inlet port 104 and the outlet port 105 are arranged in the embedded portion 100b of the housing 100, air warmed inside the housing 100 is exhausted to the space inside the console 30, and the warmed air is repeatedly sucked into the housing 100. Thus, there is a risk that the cooling efficiency of the heat sources may decrease. Because a temperature of the space inside the console 30 rises, there is a risk that a temperature of the equipment may rise if other equipment is juxtaposed in the console 30. According to the present exemplary embodiment, these issues can be avoided.

According to the present exemplary embodiment, the air flow generated inside the housing 100 gradually rises from the inlet port 104 toward the outlet port 105. Thus, the air flow can cool both the heat sources located at a lower position and a higher position inside the housing 100. For example, in a case where the inlet port 104 and the outlet port 105 are arranged in the exposed portion 100a of the housing 100, the cooling efficiency of the heat source located in the lower position inside the housing 100 (for example, the embedded portion 100b) may decrease. In a case where the air flow rises as in the present exemplary embodiment, the cooling efficiency of the heat sources can be further improved if a short heat source is arranged on an upstream side and a tall heat source is arranged on a downstream side of the air flow.

Another one of the effects is that the inlet port 104 is arranged in the embedded portion 100b of the housing 100, and thus can reduce suction of dust on the console upper surface 30a of the console 30. The console upper surface 30a of the console 30 is in an environment where dust can be easily stirred up by movement of an operator and other room conditions. Thus, in a case where the inlet port 104 is arranged in the exposed portion 100a of the housing 100, there is a risk that the dust stirred up is sucked and easily introduced into the housing 100. Since relatively little dust is stirred up in the space inside the console 30, the inlet port 104 is arranged in the embedded portion 100b of the housing 100 as in the present exemplary embodiment, and thus an amount of the dust introduced into the housing 100 can be reduced.

Yet another one of the effects is that the heat generating element 108 is located away from the operation unit 12, and thus a temperature rise in the operation unit 12 can be suppressed. According to the present exemplary embodiment, the heat generating element 108 is separated from the operation unit 12 and is attached to the lower surface of the housing 100 via the substrate 111. Thus, most of the heat generated by the heat generating element 108 is transferred and ventilated by the air flow inside the operation device 10, and is conducted to the housing 100 (the second housing 102). Accordingly, it is possible to suppress the temperature rise in the operation unit 12 and an uncomfortable feeling given to the operator.

A second exemplary embodiment is to be described. A basic configuration of an operation device according to the second exemplary embodiment is similar to that illustrated in FIG. 1. Components similar to those according to the first exemplary embodiment are denoted by the same reference numerals, descriptions of the similar components are omitted, and differences from the first exemplary embodiment are to be mainly described.

Figure 8:
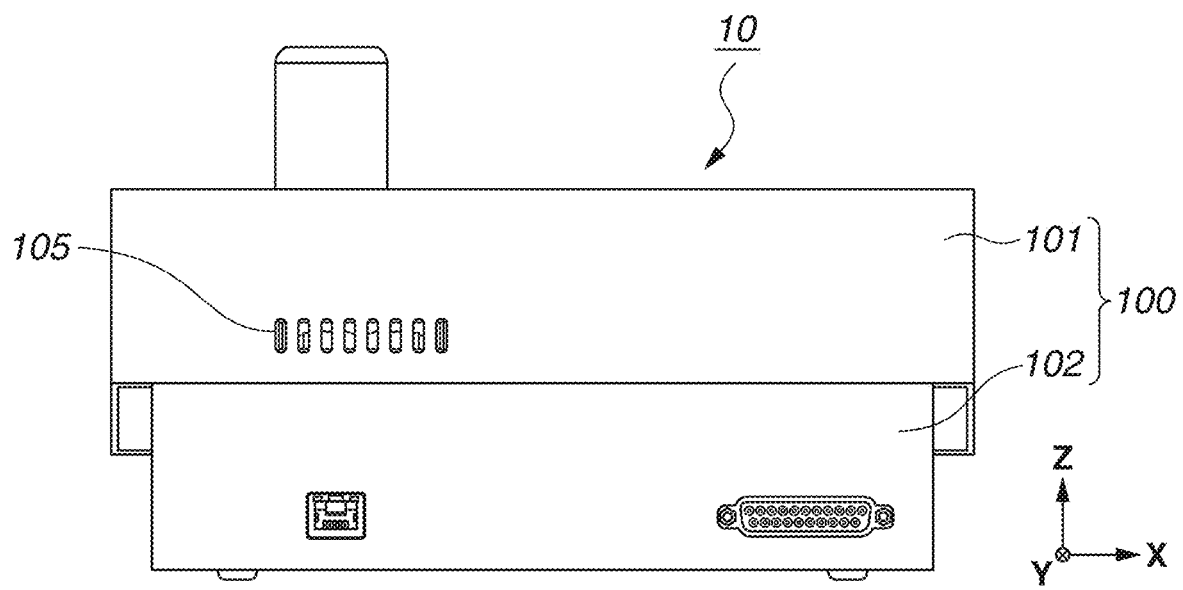
FIG. 8 is a rear view of the operation device according to the second exemplary embodiment.
Figure 9:
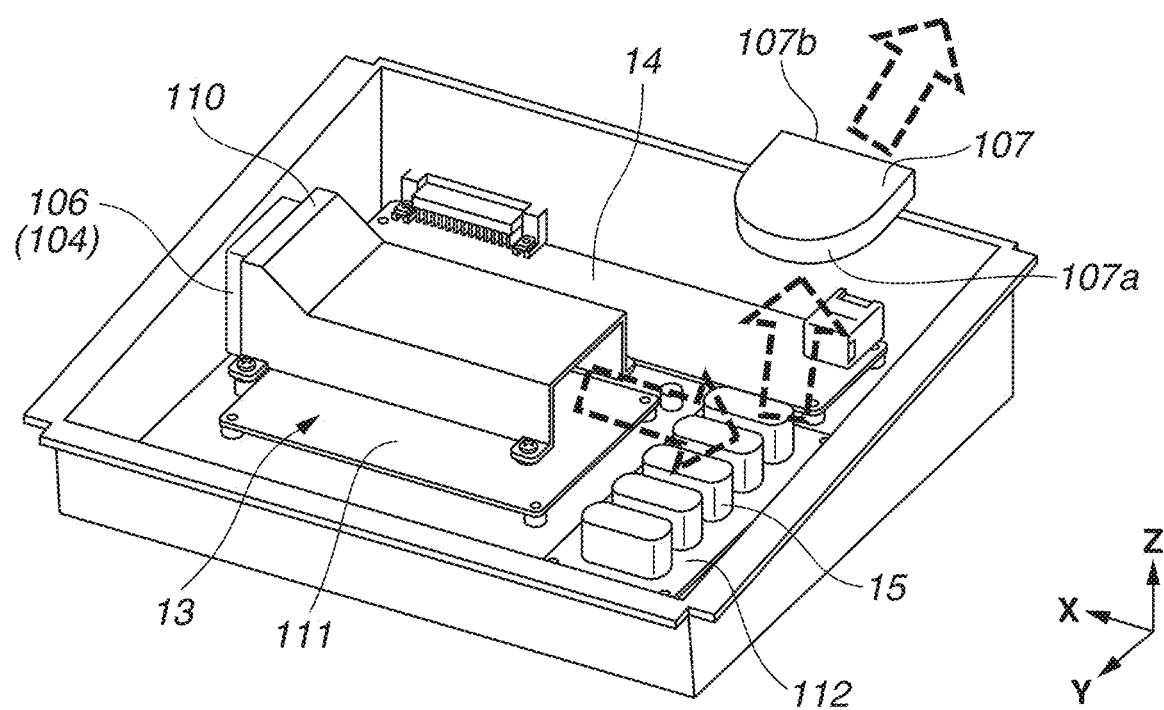
FIG. 9 illustrates air flow in the operation device according to the second exemplary embodiment.

The operation device 10 according to the second exemplary embodiment is to be described with reference to FIGS. 7 to 9.

Figure 7:
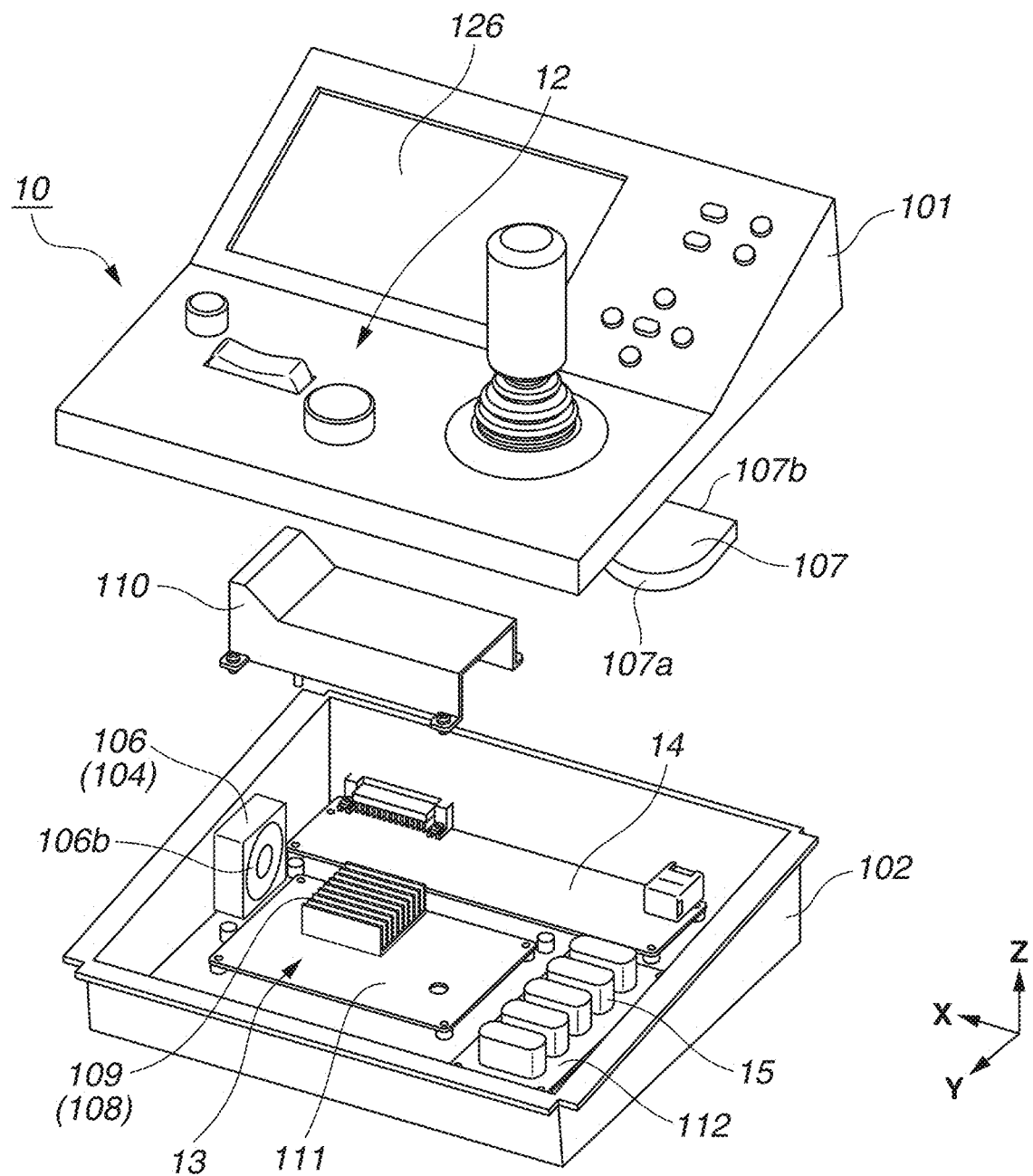
FIG. 7 is an exploded perspective view of an operation device according to a second exemplary embodiment.

FIG. 7 is an exploded perspective view of the operation device 10. FIG. 8 is a rear view of the operation device 10.

According to the present exemplary embodiment, an inlet fan 106 including an axial flow fan is arranged near the inlet port 104 in addition to the configuration according to the first exemplary embodiment. The inlet fan 106 is installed inside the second housing 102 and arranged with a discharge port 106b facing in the −X direction so that a suction port (not illustrated in FIG. 7) faces the inlet port 104.

According to the present exemplary embodiment, a duct 110 that is an air guide member is installed inside the housing 100. The duct 110 that is connected to the discharge port 106b of the inlet fan 106 and extends straight is installed on the substrate 111 of the control unit 13. An outlet of the duct 110 is located in a discharge direction of the inlet fan 106. The duct 110 has a U-shaped cross section which is opened at the lower side, is installed to be placed on the substrate 111 of the control unit 13, and forms an air path together with the substrate 111. The duct 110 is installed to cover the heatsink 109, and the heat generating element 108 and the heatsink 109 are arranged inside the duct 110.

The power supply unit 15 is located outside the duct 110 in an extending direction of the duct 110 and is arranged such that at least a part of the power supply unit 15 faces the outlet of the duct 110.

According to the present exemplary embodiment, the outlet port 105 is formed on the right side (the −X direction) of the rear surface of the first housing 101. Accordingly, a direction of the exhaust fan 107 is changed compared with that according to the first exemplary embodiment, and the exhaust fan 107 is arranged such that the suction port 107a faces in the +Y direction and the discharge port 107b faces the outlet port 105. Although it is described that the suction port 107a faces in the +Y direction, the suction port 107a may also be arranged with an angle so that the suction port 107a faces slightly the +X direction side.

Air flow inside the housing 100 of the operation device 10 according to the second exemplary embodiment is to be described with reference to FIG. 9. FIG. 9 illustrates the air flow in the operation device 10, and dotted arrows visualize the air flow inside the housing 100.

Air in the space inside the console 30 is sucked by the inlet fan 106 and flows into the housing 100 from the inlet port 104. The air sucked by the inlet fan 106 and discharged from the discharge port 106b flows through the air path formed by the duct 110 and the substrate 111 of the control unit 13 along the fins of the heatsink 109 to cool the heat generating element 108. The air flowing out of the outlet of the duct 110 hits a part of the power supply unit 15 and cools the power supply unit 15. The air hits the power supply unit 15 and an inner wall of the right side surface of the housing 100, thus its flow velocity decreases, and then the air is sucked through the suction port 107a of the exhaust fan 107, so that a direction of the air flow is changed to back (the −Y direction) and upward (the Z direction) directions. The air inside the housing 100 is sucked through the suction port 107a of the exhaust fan 107, is discharged from the discharge port 107b, passes through the outlet port 105, and is exhausted to the outside of the housing 100 and the console 30.

Effects due to the configuration of the operation device 10 according to the second exemplary embodiment are to be described. In addition to the effects described in the first exemplary embodiment, following effects are further considered.

One of the effects is that the inlet fan 106 is installed and thus increases the flow velocity of the air flowing inside the housing 100. For this reason, heat transfer can be promoted on the surfaces of the components inside the housing 100, including the heat generating element 108 and the power supply unit 15, and the cooling efficiency can be further increased.

The duct 110 forms the air path and thus can improve wind directionality. According to the present exemplary embodiment, because an air outflow direction from the duct 110 is toward the power supply unit 15, the directionality of the air toward the power supply unit 15 can be increased, and the cooling efficiency to cool the power supply unit 15 can also be increased by surely applying cooling air to the power supply unit 15.

Another one of the effects is that the outlet port 105 is located on the rear surface of the housing 100 and exhausts air in the −Y direction, so that it is possible to reduce an influence of exhaust air on equipment adjacent to the operation device 10. In the image capturing system that uses the operation device 10, a plurality of operation devices and other equipment are often installed next to each other on the same console 30. The configuration as described in the present exemplary embodiment in which the outlet port 105 is located on the rear surface of the housing 100 is adopted, and thus it is possible to prevent the outlet port 105 from being blocked by equipment adjacent to the operation device 10. The exhaust air from the operation device 10 is prevented from hitting an operator who operates the adjacent equipment, thereby preventing him/her from feeling uncomfortable.

Yet another one of the effects is that the inlet port 104 and the inlet fan 106 are arranged on the side surface of the housing 100, so that driving sound of the inlet fan 106 that is felt by the operator can be reduced.

Particularly, if the inlet port 104 and the inlet fan 106 are arranged on the front surface of the housing 100 in the operation device 10 installed such that the part of the housing 100 is embedded in the console 30, they are located near the operator. Thus, the driving sound of the inlet fan 106 may be transmitted to the operator, which may cause the operator an uncomfortable feeling. The inlet port 104 and the inlet fan 106 are arranged on the side surface of the housing 100 as in the present exemplary embodiment, and it is possible to distance the operator from the inlet port 104 and the inlet fan 106 and to reduce the uncomfortable feeling caused by the driving sound.

An operation device 10 according to a modification of the second exemplary embodiment is to be described with reference to FIGS. 10 and 11.

Figure 10:
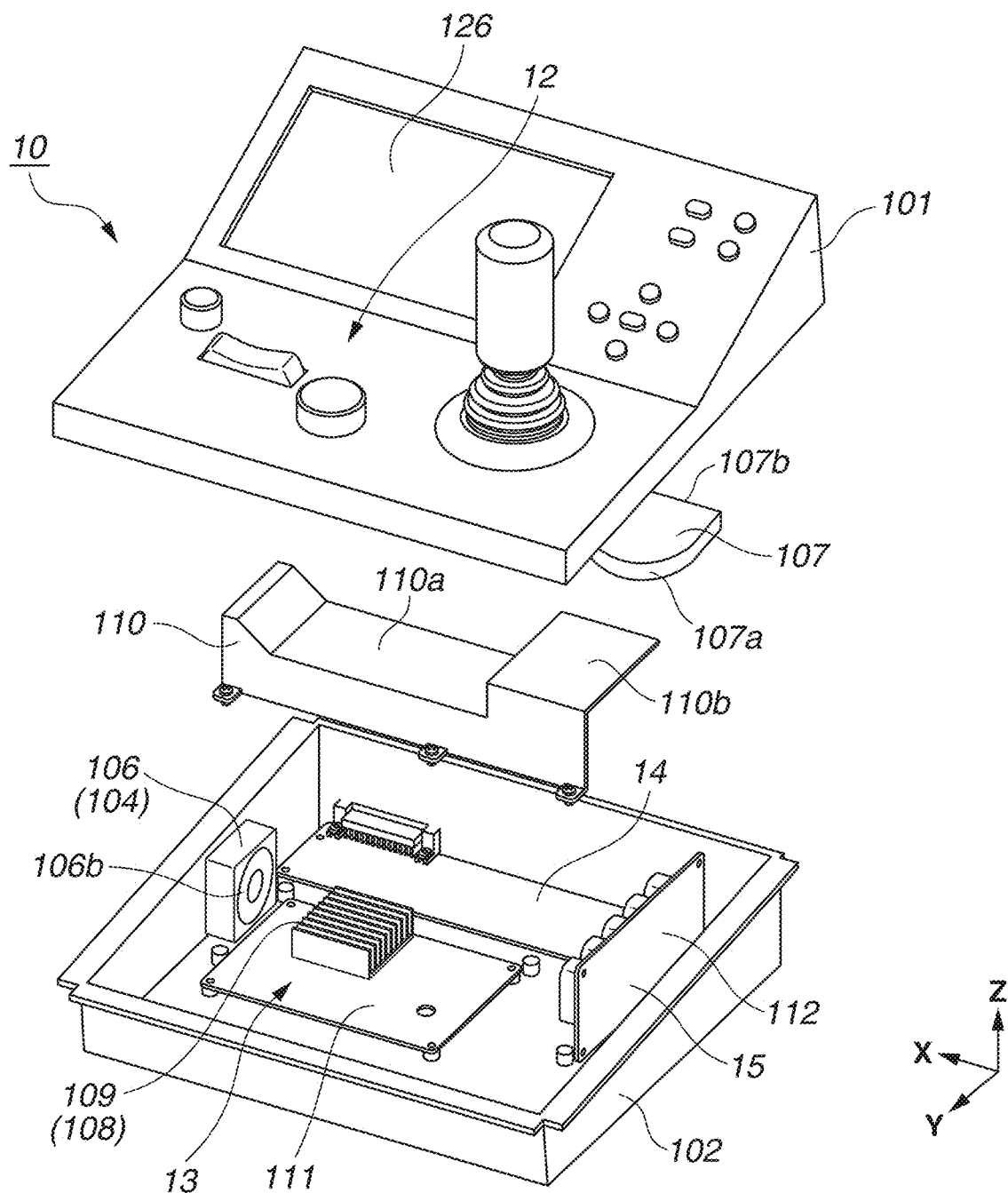
FIG. 10 is an exploded perspective view of an operation device according to a modification of the second exemplary embodiment.
Figure 11:
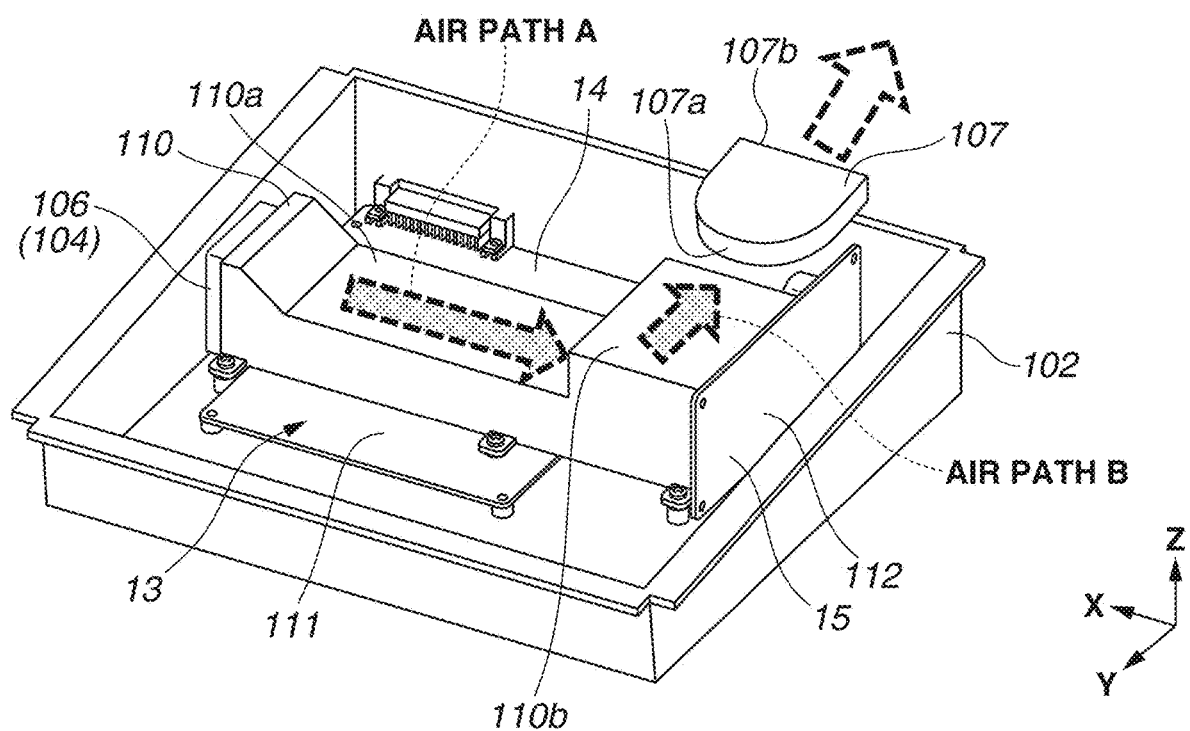
FIG. 11 illustrates air flow in the operation device according to the modification of the second exemplary embodiment.

FIG. 10 is an exploded perspective view of the operation device 10.

According to the modification, a way of installing the power supply unit 15 is different from that in the second exemplary embodiment. The power supply unit 15 is arranged such that the substrate 112, which has a large projected area, is orthogonal to the extending direction (the ±Y direction) of the duct 110. In other words, the substrate 112 of the power supply unit 15 faces in the discharge direction of the inlet fan 106. The power supply unit 15 may be set with this orientation by holding the substrate 112 using a power supply holding member (not illustrated).

According to the modification, a shape of the duct 110 is different from that in the second exemplary embodiment. The duct 110 includes a portion 110a that is connected to the discharge port 106b of the inlet fan 106 and extends straight as in the second exemplary embodiment. The duct 110 further includes a portion 110b that extends continuously from the portion 110a toward the exhaust fan 107. A ceiling surface (a surface in the +Z direction) of the portion 110b is one step higher than a ceiling surface (a surface in the +Z direction) of the portion 110a. The portion 110a forms an air path A together with the substrate 111 of the control unit 13 as in the second exemplary embodiment. The portion 110b forms an air path B from a vicinity of the power supply unit 15 toward the exhaust fan 107 together with the substrate 112 of the power supply unit 15 and the second housing 102.

Air flow inside the housing 100 of the operation device 10 according to the modification of the second exemplary embodiment is to be described with reference to FIG. 11. FIG. 11 illustrates the air flow in the operation device 10, and dotted arrows visualize the air flow inside the housing 100.

Air in the space inside the console 30 is sucked by the inlet fan 106 and flows into the housing 100 from the inlet port 104. The air sucked by the inlet fan 106 and discharged from the discharge port 106b flows through the air path A along the fins of the heatsink 109 to cool the heat generating element 108. The air flowing from the air path A to the air path B hits and cools the power supply unit 15. The air flowing out of the air path B is sucked through the suction port 107a of the exhaust fan 107, is discharged from the discharge port 107b, passes through the outlet port 105, and is exhausted to the outside of the housing 100 and the console 30.

Effects due to the configuration of the operation device 10 according to the modification of the second exemplary embodiment are to be described. In addition to the effects described in the second exemplary embodiment, following effects are further considered.

One of the effects is that the cooling efficiency of the power supply unit 15 can be improved. The power supply unit 15 forms a part of the air path B, and thus it is possible to ensure a constant amount of air that hits the power supply unit 15. Cooling air collides with the power supply unit 15 in the vertical direction at an intersection of the air path A and the air path B, thereby contributing to an increase in heat transfer coefficient and improving the cooling efficiency. Thus, it is desirable to arrange a heat generating element that generates a large amount of heat or has a low recommended operating temperature in the power supply unit 15 near the intersection of the air path A and the air path B.

A third exemplary embodiment is to be described. A basic configuration of an operation device according to the third exemplary embodiment is similar to that illustrated in FIG. 1. Components similar to those according to the first exemplary embodiment are denoted by the same reference numerals, descriptions of the similar components are omitted, and differences from the first exemplary embodiment are mainly described.

The operation device 10 according to the third exemplary embodiment is to be described with reference to FIGS. 12 and 13.

Figure 12:
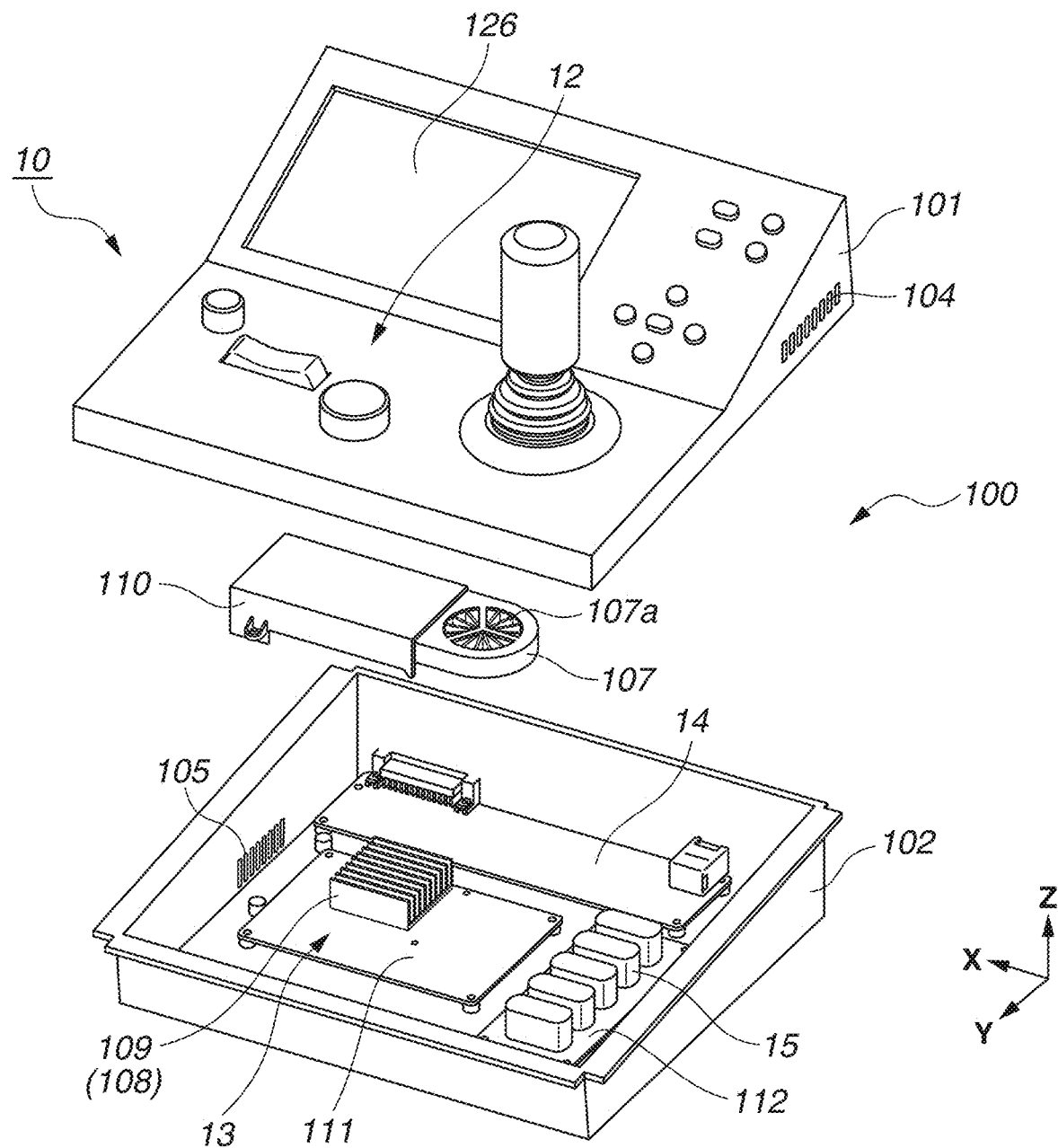
FIG. 12 is an exploded perspective view of an operation device according to a modification of a third exemplary embodiment.
Figure 13:
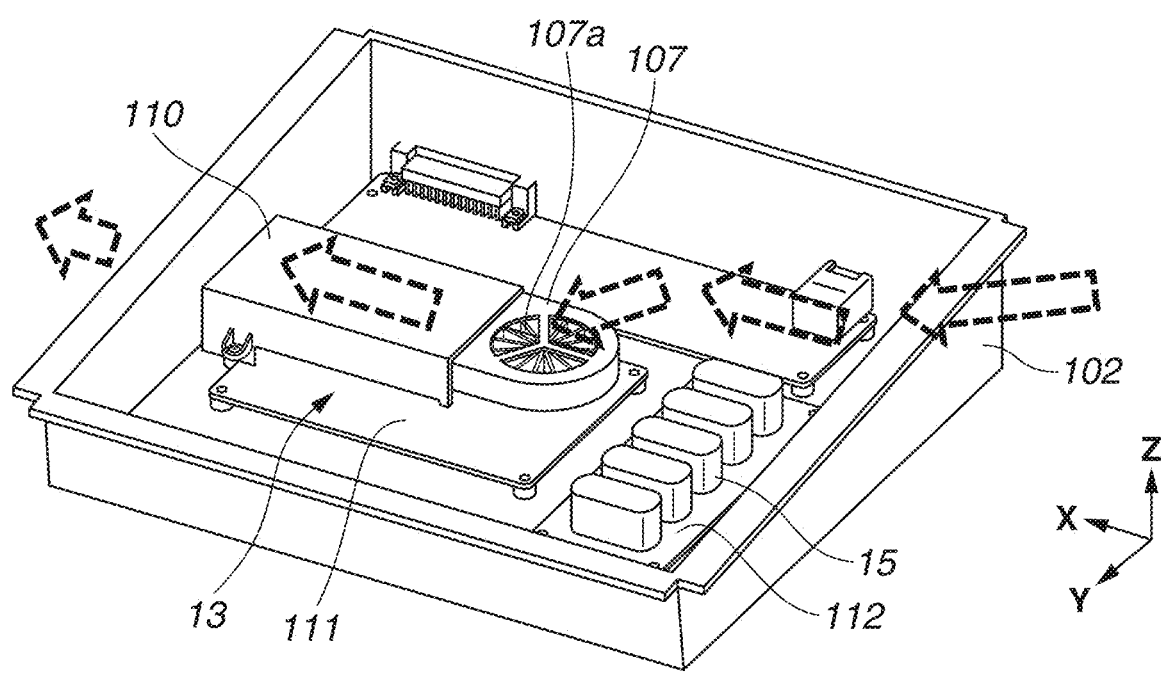
FIG. 13 illustrates air flow in an operation device according to the third exemplary embodiment.

FIG. 12 is an exploded perspective view of the operation device 10.

According to the present exemplary embodiment, an arrangement relationship between the inlet port 104 and the outlet port 105 is reversed with respect to that in the first exemplary embodiment. In other words, the inlet port 104 is formed at the back (the −Y direction) of the right side surface of the first housing 101. In other words, the inlet port 104 is arranged in the exposed portion 100a of the housing 100. The outlet port 105 is formed in the center portion of the left side surface of the second housing 102. In other words, the outlet port 105 is arranged in the embedded portion 100b of the housing 100.

A fan is installed inside the housing 100 to generate air flow from the inlet port 104 to the outlet port 105. According to the present exemplary embodiment, the exhaust fan 107 including a centrifugal fan is arranged on the substrate 111 of the control unit 13. The exhaust fan 107 is arranged on an opposite side of the outlet port 105 with the heat generating element 108 and the heatsink 109 on the substrate 111 in between. The exhaust fan 107 is arranged such that the suction port 107a faces in the +Z direction, and the discharge port (which is hidden behind the duct 110 and not illustrated in FIGS. 12 and 13) faces in the +X direction, that is, faces the heat generating element 108 and the heatsink 109.

The duct 110 that is the air guide member is installed inside the housing 100. The duct 110 that is connected to the discharge port of the exhaust fan 107 and extends straight is installed on the substrate 111 of the control unit 13. The outlet of the duct 110 is connected to the outlet port 105. As in the second exemplary embodiment, the duct 110 and the substrate 111 of the control unit 13 form an air path together, and the heat generating element 108 and the heatsink 109 are arranged inside the duct 110.

Air flow inside the housing 100 of the operation device 10 according to the third exemplary embodiment is to be described with reference to FIG. 13. FIG. 13 illustrates the air flow in the operation device 10, and dotted arrows visualize the air flow inside the housing 100.

Air in the space outside the console 30 flows into the housing 100, which is under negative pressure due to the exhaust fan 107, from the inlet port 104. The air flowing in from the inlet port 104 passes a position of the power supply unit 15, and then is sucked through the suction port 107a of the exhaust fan 107. The air discharged from the discharge port of the exhaust fan 107 flows through the air path formed by the duct 110 and the substrate 111 of the control unit 13 along the fins of the heatsink 109 to cool the heat generating element 108. The air flowing out of the outlet of the duct 110 passes through the outlet port 105 and is exhausted to the outside of the housing 100.

According to the present exemplary embodiment, the inlet port 104 is arranged in the exposed portion 100a of the housing 100, and the outlet port 105 is arranged in the embedded portion 100b, so that the heat sources can be efficiently cooled. The air warmed by cooling the heat sources inside the housing 100 is exhausted from the embedded portion 100b to the outside of the console 30, but as described in the first exemplary embodiment, it is possible to avoid taking in the warmed air again and prevent the cooling efficiency of the heat sources from decreasing.

According to the present exemplary embodiment, the air flow generated inside the housing 100 gradually descends from the inlet port 104 to the outlet port 105. In this case as well, the air flow can cool both the heat sources located at a lower position and a higher position inside the housing 100. In a case where the air flow descends as in the present exemplary embodiment, the cooling efficiency of the heat sources can be further increased if a tall heat source is arranged on the upstream side and a short heat source is arranged on the downstream side of the air flow.

The arrangements of the inlet port 104 and the outlet port 105 described according to the first to the third exemplary embodiments are merely examples, and the arrangements are not limited to the above examples.

The inlet port 104 may be arranged in either one of the embedded portion 100b and the exposed portion 100a of the housing 100, and the outlet port 105 may be arranged in the other. In order to prevent warmed air from being exhausted into the space inside the console 30, it is desirable to arrange the inlet port 104 in the embedded portion 100b and arrange the outlet port 105 in the exposed portion 100a.

According to the first and the second exemplary embodiments, the inlet port 104 is arranged on the left side surface of the second housing 102, but may be arranged on the right side surface of the second housing 102. In a case where the inlet port 104 is arranged on the right side surface of the second housing 102, it is desirable to arrange the outlet port 105 on the left side surface of the first housing 101 in the first exemplary embodiment and on a left side (the +X direction) of the rear surface of the first housing 101 in the second exemplary embodiment.

According to the third exemplary embodiment, the outlet port 105 is arranged on the left side surface of the second housing 102, but may be arranged on the right side surface of the second housing 102. In a case where the outlet port 105 is arranged on the right side surface of the second housing 102, it is desirable to arrange the inlet port 104 on the left side surface of the first housing 101 or on a left side (the +X direction) of the rear surface of the first housing 101.

Although it is described that the heat generating element 108 of the control unit 13 and the power supply unit 15 are the heat sources, another component may be used as the heat source. The number of components that are regarded as heat sources is also not limited.

While the present disclosure is described along with the exemplary embodiments, the above-described exemplary embodiments are merely examples of implementation of the present disclosure, and the technical scope of the present disclosure should not be construed to be limited by these exemplary embodiments. In other words, the present disclosure can be implemented in the various forms without departing from the technical idea and/or the main features thereof.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-205269, filed Dec. 22, 2022, which is hereby incorporated by reference herein in its entirety.

What is claimed is:

1. An operation device comprising:
  a housing comprising:
    an operation surface on which an operation unit is provided, the operation unit configured to control an external device;
    a plurality of surfaces extending from the operation surface;
    an inlet port formed in at least one of the plurality of surfaces of the housing and configured to take air into an inside of the housing from an outside of the housing; and
    an outlet port formed in at least another one of the plurality of surfaces of the housing and configured to exhaust the air from the inside of the housing to the outside of the housing; and
  at least one mounting unit protruding from the plurality of sides in an outer circumferential direction of the housing, the at least one mounting unit configured to install the operation device into a console and divides the housing into:
    an exposed portion including the operation surface, a first portion of the plurality of surfaces and the outlet port, the exposed portion configured to be exposed when the operation device is installed in the console, and
    an embedded portion including a second portion of the plurality of surfaces and the outlet, embedded portion configured to be exposed when the operation device is installed in the console.

2. The operation device according to claim 1, further comprising a fan installed inside the housing and configured to generate a flow of the air from the inlet port toward the outlet port.

3. The operation device according to claim 2, wherein the fan is a plurality of fans that includes a first fan installed near the outlet port and a second fan installed near the inlet port.

4. The operation device according to claim 1, further comprising a heat source arranged in the embedded portion inside the housing.

5. The operation device according to claim 1, further comprising:
  an air guide member installed inside the housing; and
  a heat source arranged inside the air guide member.

6. The operation device according to claim 5, wherein the heat source includes a plate-shaped portion, the air guide member is a duct, and the plate-shaped portion and the duct form an air path together.

7. The operation device according to claim 1, further comprising:
  two heat sources inside the housing; and
  an air guide member installed inside the housing, wherein one of the two heat sources is arranged inside the air guide member, and another of the two heat sources is arranged outside the air guide member such that at least a part of the another of the two heat sources faces an outlet of the air guide member.

8. The operation device according to claim 1, wherein the operation unit comprises at least one of a joystick, a lever, a dial or a button.

9. The operation device according to claim 8, wherein the operation surface further comprises a display.

* * * * *